United States Patent [19]
Amberntsson et al.
[11] 3,953,862
[45] Apr. 27, 1976

[54] PRINTING HEAD DEVICE FOR AN INK JET PRINTER

[75] Inventors: Jan Roger Amberntsson; Roger Ingemar Andersson, both of Angered; Stig Bertil Sultan, Floda, all of Sweden

[73] Assignee: Facit Aktiebolag, Atvidaberg, Sweden

[22] Filed: Dec. 26, 1974

[21] Appl. No.: 536,606

[30] Foreign Application Priority Data

Dec. 28, 1973 Sweden .............................. 7317524

[52] U.S. Cl. .............................................. 346/140 R
[51] Int. Cl.$^2$ .......................................... G01D 15/16
[58] Field of Search ..................................... 346/140

[56] References Cited

UNITED STATES PATENTS

| | | | |
|---|---|---|---|
| 2,335,633 | 11/1943 | Beecher | 346/140 A |
| 3,247,519 | 4/1966 | Sihvonen | 346/140 A |
| 3,747,120 | 7/1973 | Stemme | 346/140 |

*Primary Examiner*—Joseph W. Hartary
*Attorney, Agent, or Firm*—Alfred E. Miller

[57] ABSTRACT

A printing head for an ink jet printer in which a liquid reservoir is operatively associated therewith. The liquid reservoir is provided with an air inlet opening having a filter which permits the passage of air but prevents liquid flow thereby preventing the leakage of liquid out of the reservoir upon the agitation of the liquid within the reservoir.

5 Claims, 3 Drawing Figures

PRINTING HEAD DEVICE FOR AN INK JET PRINTER

BACKGROUND OF THE INVENTION

Ink jet printing devices that are known have arrangements in which, for example, printing ink is conveyed from a liquid reservoir to a movable printing head by means of comparatively long flexible hoses. It is quite difficult to replace the long hoses with a liquid reservoir that follows the movement of the printing head because the reservoir is subject to considerable acceleration and deceleration due to the rather rapid movements of the printing head. Consequently, the rapid movements of the liquid in the reservoir cause liquid agitation so that on one hand air is mixed into the liquid and on the other hand the liquid can leak out of the air inlet opening to the reservoir. Moreover, the air mixed with the liquid in the reservoir further causes foam to be formed on the liquid surface which, in turn, causes liquid to leak through the air inlet opening.

SUMMARY OF THE INVENTION

It is an object of the present invention to provide an ink jet printing head with an associated liquid reservoir in which the latter is provided with an air inlet opening having a filter that permits the passage of air to the interior of the reservoir receptacle but prevents the flow of liquid out of the receptacle.

It is another object of the present invention to provide a filter for the inlet opening of the reservoir which is constituted of a non-wetting material.

A further object of the present invention is an alternate construction of the reservoir having a cover for the open top of the reservoir that is entirely of a non-wetting filter material.

The invention will now be more fully described with reference to the accompanying drawings as follows.

DESCRIPTION OF THE PREFERRED EMBODIMENTS

Figure 1:
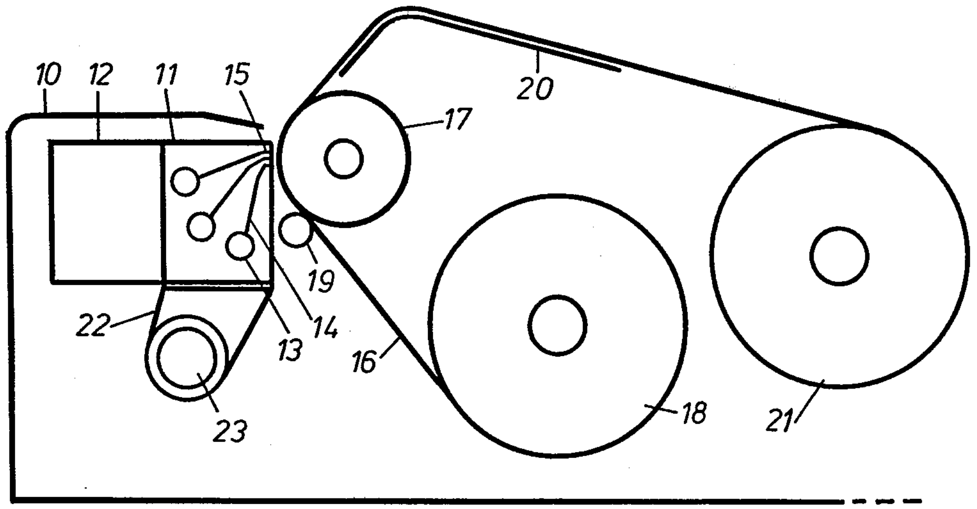
FIG. 1 is a diagrammatic view of the printing head device for an ink jet printer constructed in accordance with the teachings of the present invention.

As seen in FIG. 1, an ink jet printer assembly is provided with a housing 10 in which is located a printing head 11 and a liquid reservoir 12. The reservoir 12 is preferably integral with the printing head 11. Each of the pump chambers of the printing head 11 are provided with a pumping means such as a piezoelectric crystal 13. The pumping means each have an ink channel 14 opening into a respective capillary nozzle 15. The liquid ink is propelled out of the nozzles 15 by means of the pumping means on the print medium, for example a paper tape 16 which is unwound from the supply roller 16. The tape 16 passes between the press roller 19 and the associated rotary roller 17 and thereafter through paper guide 20 and finally wound on take-up reel 21.

The printing head 11 is secured to a support 22 which in turn is slidably mounted on a shaft 23. Furthermore, the printing head can be moved transversely along the roller 17 by means of a driving device (not shown).

Figure 2:
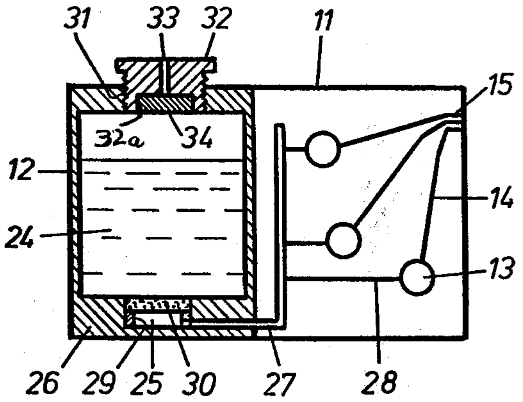
FIG. 2 is an enlarged side elevational view, partly in section, of the details of construction of the printing head and its associated reservoir.

Referring now to FIG. 2 in which the printing head 11 and associated reservoir 12 is shown in greater detail, the liquid 24 can be conveyed to the various pump chambers in the printing head by means of the enlarged bore 25 in the bottom section 26 of the reservoir and through conduit 27 and connecting channels 28. An annular support member 29 is shown located in the bore 25 with the filter element 30 resting thereon. The filter 30 is constituted of porous material so that its capillaries, when filled with liquid, prevent air from entering the conduit 27.

As seen in FIG. 2, the top of the reservoir is provided with a threaded opening 31 through which liquid is supplied to the reservoir 12. A plug 32 is threaded into the opening 31 and has an air inlet channel 33. The bottom of the plug 32 is provided with a countersunk bore 32a having a filter 34 therein. Thus, air passing through the channel 33 into the reservoir has to pass through the filter 34. The latter is constituted of a non-wetting material, for example polytetrafluoroethylene which has a multiplicity of narrow channels.

Since the filter material is non-wetting the liquid cannot pass through the channels to the air inlet channel 33 but air can pass the other way through the filter 34 without any blockage. Therefore, the present construction prevents liquid from leaking out through channel 33 in the case of liquid foaming as the result of rapid movements of the printing liquid 24.

Figure 3:
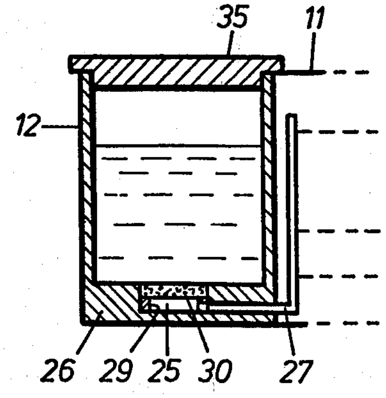
FIG. 3 is an enlarged sectional view of an alternate embodiment of the reservoir shown in FIG. 2.

Referring now to the construction shown in FIG. 3 in which the open top reservoir 12 is illustrated as provided with a closing cover 35 composed of a non-wetting material and corresponding to the filter 34 of FIG. 2. Numerous channels can be made in the entire surface of the cover 35 for the purpose of admitting air to the reservoir 12.

It should be noted that for both the constructions of FIG. 2 and FIG. 3 the non-wetting filter is placed above the normal liquid level in the reservoir 12.

The present liquid reservoir for an ink jet printing head includes a filter which successfully allows the passage of air but prevents the flow of liquid therethrough.

What is claimed is:

1. In a printing head device for an ink jet printer the improvement comprising: a liquid reservoir for said ink supply associated with said printing head and movable therewith and provided with an air inlet opening, and a filter in said opening being constituted of a material that permits the passage of air but prevents the flow of liquid therethrough.

2. A liquid reservoir as claimed in claim 1 wherein said filter is constituted of a non-wetting material.

3. A liquid reservoir as claimed in claim 2 wherein said filter is constituted of a polytetrafluoroethylene.

4. A liquid reservoir as claimed in claim 1 wherein both said air inlet opening and said filter are disposed above the normal liquid level in said reservoir.

5. In a printing head device for an ink jet printer the improvement comprising: a liquid reservoir for said ink supply associated with said printing head, said reservoir being provided with a top opening, and a cover for said opening which is at least partly constituted of a filter material, said filter material being of the non-wetting type that permits the passage of air but prevents the flow of liquid therethrough.

* * * * *